(12) United States Patent
Ye

(10) Patent No.: US 8,406,832 B2
(45) Date of Patent: Mar. 26, 2013

(54) HOUSING FOR ELECTRONIC DEVICE

(75) Inventor: De-Zhi Ye, Shenzhen (CN)

(73) Assignees: Shenzhen Futaihong Precision Industry Co., Ltd., Shenzhen (CN); FIH (Hong Kong) Limited, Kowloon (HK)

( * ) Notice: Subject to any disclaimer, the term of this patent is extended or adjusted under 35 U.S.C. 154(b) by 485 days.

(21) Appl. No.: 12/637,901

(22) Filed: Dec. 15, 2009

(65) Prior Publication Data
US 2010/0254075 A1 Oct. 7, 2010

(30) Foreign Application Priority Data
Apr. 2, 2009 (CN) .......................... 2009 1 0301324

(51) Int. Cl.
*H04M 1/00* (2006.01)
(52) U.S. Cl. ....... 455/575.8; 428/45; 428/46; 455/575.1

(58) Field of Classification Search ............... 428/195.1, 428/469, 45, 46; 361/679.21; 455/575.1, 455/575.8
See application file for complete search history.

(56) References Cited

U.S. PATENT DOCUMENTS

| 7,684,178 | B2 * | 3/2010 | Hsu et al. | 361/679.21 |
| 8,076,011 | B2 * | 12/2011 | Chiang et al. | 428/696 |
| 8,080,284 | B2 * | 12/2011 | Shi et al. | 427/259 |
| 8,080,306 | B2 * | 12/2011 | Fukuma et al. | 428/195.1 |
| 8,097,344 | B2 * | 1/2012 | Chiang et al. | 428/469 |

FOREIGN PATENT DOCUMENTS
CN 1904978 A 1/2007

* cited by examiner

*Primary Examiner* — Cathy Lam
(74) *Attorney, Agent, or Firm* — Altis Law Group, Inc.

(57) ABSTRACT

A housing for an electronic device comprises a substrate, a base coat, and a transparent top coat. The substrate is a transparent or a translucent plastic substrate and has opposite surfaces. The base coat and the top coat are respectively formed on the opposite surfaces of the substrate.

8 Claims, 2 Drawing Sheets

HOUSING FOR ELECTRONIC DEVICE

BACKGROUND

1. Technical Field

The present disclosure relates to housing for an electronic device.

2. Description of Related Art

Housings of electronic devices are commonly made of plastic. These plastic housings are commonly surface treated for example by spray painting, physical vapor deposition or electroplating to form decorative coats on the housings. Decorative coats formed by spray paint usually include a primer, a base coat formed on the primer, and a top coat formed on the base coat. Although spray painting the housing gives a colorful appearance, the painted decoration often appears flat and not as aesthetic as may be desired.

Therefore, there is room for improvement within the art.

BRIEF DESCRIPTION OF THE FIGURES

Many aspects of the housing can be better understood with reference to the following figure. The components in the figures are not necessarily drawn to scale, the emphasis instead being placed upon clearly illustrating the principles of the housing. Moreover, in the drawings like reference numerals designate corresponding parts throughout the several views.

DETAILED DESCRIPTION

Figure 1:
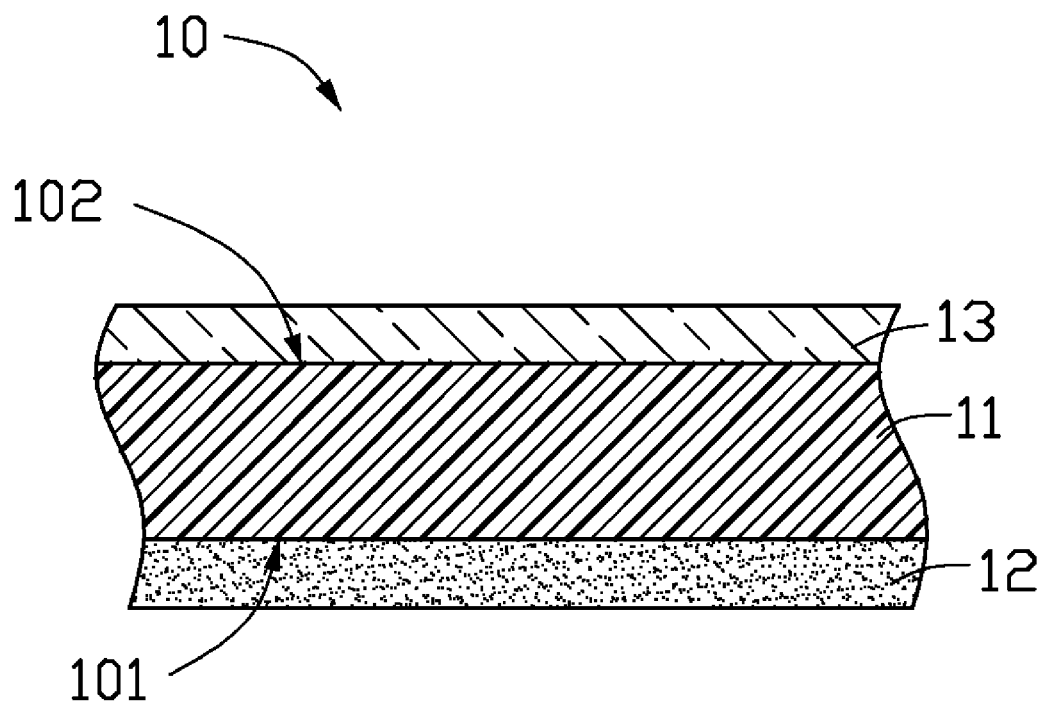
FIG. 1 is a cross-sectional view of a first exemplary embodiment of a housing.

Referring to FIG. 1, in a first exemplary embodiment, a housing 10 includes a substrate 11, a base coat 12 formed on one surface of the substrate 11, and a top coat 13 formed on the other surface of the substrate 11.

The substrate 11 may be formed by molding using transparent or translucent plastic. The plastic material may be selected from a group consisting of polycarbonate (PC), polyethylene terephthalate (PET), polypropylene (PP), polyamide (PA), and polymethyl methacrylate (PMMA). The substrate 11 includes a first surface 101 on one side and a second surface 102 on an opposite side. The substrate 11 can be colored by including pigment in the plastic during molding of the substrate 11.

The base coat 12 is formed on the first surface 101 of the substrate 11 by spray painting. The base coat 12 may be colored according to the desired contrast with the color of the substrate 11, e.g., if the substrate 11 is red making the base coat 12 black.

The top coat 13 is a transparent coat formed on the second surface 102 of the substrate 11 with spray paint. The paint used for forming the top coat 13 may be, for example, polyurethane paint or ultraviolet curing paint. The top coat 13 can be waterproof and dustproof, and has a high resistance to abrasion.

The combination of the base coat 12, the transparent top coat 13 and the transparent or translucent substrate 11 can cause different refractions and reflections to light from different viewing angles, thus giving an appearance of depth to decoration of the housing 10.

Figure 2:
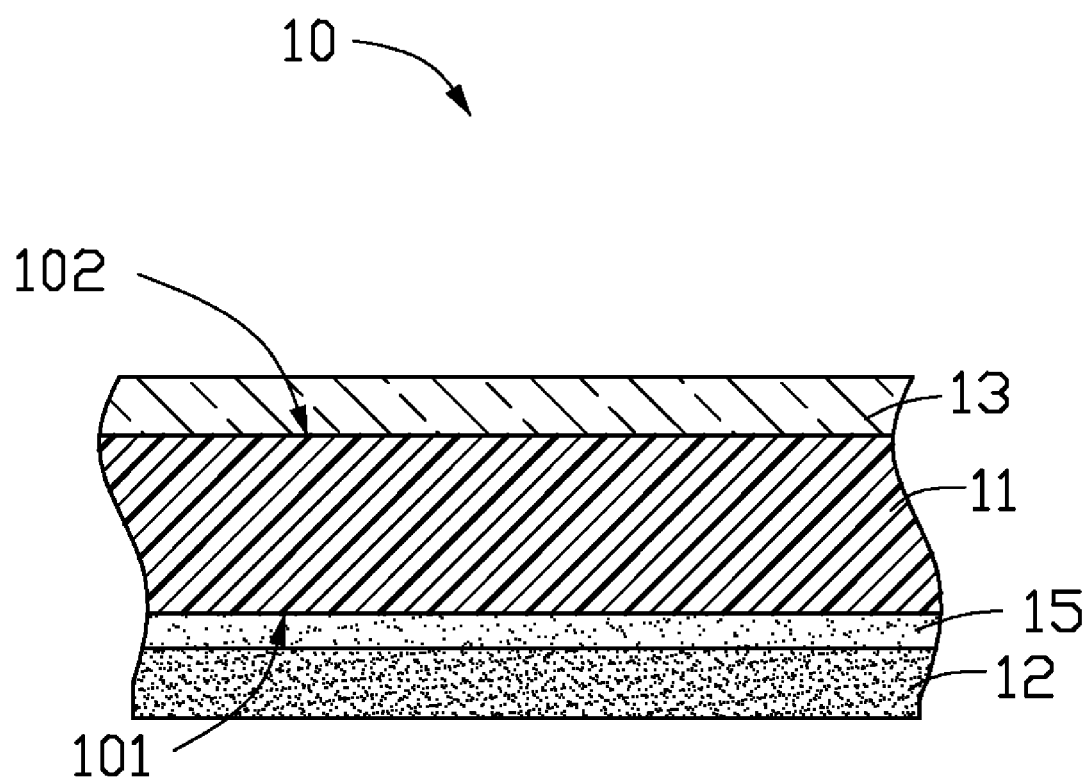
FIG. 2 is a cross-sectional view of a second exemplary embodiment of a housing.

Referring to FIG. 2, a transparent or a translucent primer coat 15 can be set between the substrate 11 and the base coat 12. That is the primer coat 15 being formed on the first surface 101 of the substrate 11, and the base coat 12 is then formed on the primer coat 15. The primer coat 15 can be colored as desired.

The exemplary housing 10 may be a housing of a mobile phone, a PDA, a camera, or a portable game device.

It should be understood, however, that even though numerous characteristics and advantages of the present embodiments have been set forth in the foregoing description, together with details of functions of the embodiments, the disclosure is illustrative only, and changes may be made in detail within the principles of the disclosure to the full extent indicated by the broad general meaning of the terms in which the appended claims are expressed.

What is claimed is:

1. A housing for an electronic device, comprising:
 a transparent or translucent substrate having opposite surfaces, the substrate having a first color;
 a base coat, the base coat covers entirely an inner surface of the substrate having a second color different from the first color; and
 a transparent top coat;
 wherein the base coat and the top coat are respectively formed on the opposite surfaces of the substrate, the combination of the base coat, the top coat, and the substrate causes different refractions and reflections to visible light from different viewing angles.

2. The housing as claimed in claim 1, wherein the substrate is made of plastic selected from a group consisting of polycarbonate, polyethylene terephthalate, polypropylene, polyamide, and polymethyl methacrylate.

3. The housing as claimed in claim 1, wherein the top coat includes polyurethane paint or ultraviolet curing paint.

4. The housing as claimed in claim 1, wherein the housing is a housing of a mobile phone, a personal digital assistant, a camera, or a portable game device.

5. A housing for an electronic device, comprising:
 a transparent or a translucent substrate, the substrate having a first color;
 a primer coat formed on one surface of the substrate;
 a base coat covers the entire surface of the primer coat, the base coat having a second color different from the first color; and
 a transparent top coat formed on the other surface of the substrate, the combination of the base coat, the top coat, and the substrate causing different refractions and reflections to visible light from different viewing angles.

6. The housing as claimed in claim 5, wherein the primer coat is transparent or translucent.

7. The housing as claimed in claim 5, wherein the top coat includes polyurethane paint or ultraviolet curing paint.

8. The housing as claimed in claim 5, wherein the substrate is made of plastic, the plastic is selected from a group consisting of polycarbonate, polyethylene terephthalate, polypropylene, polyamide, and polymethyl methacrylate.

* * * * *